United States Patent
Wang et al.

(10) Patent No.: US 9,094,061 B2
(45) Date of Patent: Jul. 28, 2015

(54) METHOD AND DEVICE FOR CONTROLLING THE DOWNLINK TRANSMISSION IN THE COORDINATED MULTI-POINT TRANSMISSION SYSTEM

(75) Inventors: Qixing Wang, Beijing (CN); Dajie Jiang, Beijing (CN); Guangyi Liu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 940 days.

(21) Appl. No.: 13/266,406

(22) PCT Filed: Apr. 27, 2010

(86) PCT No.: PCT/CN2010/072238
§ 371 (c)(1),
(2), (4) Date: Jan. 5, 2012

(87) PCT Pub. No.: WO2010/124621
PCT Pub. Date: Nov. 4, 2010

(65) Prior Publication Data
US 2012/0188888 A1 Jul. 26, 2012

(51) Int. Cl.
*G01R 31/08* (2006.01)
*G06F 11/08* (2006.01)
*G08C 15/00* (2006.01)
*H04J 1/16* (2006.01)
(Continued)

(52) U.S. Cl.
CPC .............. *H04B 7/024* (2013.01); *H04B 7/0617* (2013.01); *H04B 17/336* (2013.01); *H04J 11/0053* (2013.01); *H04L 1/0025* (2013.01); *H04L 1/20* (2013.01); *H04L 5/0025* (2013.01); *H04L 5/0037* (2013.01); *H04L 25/03305* (2013.01); *H04L 25/03331* (2013.01); *H04L 1/0003* (2013.01); *H04L 1/0009* (2013.01); *H04W 72/082* (2013.01)

(58) Field of Classification Search
CPC .................. H04L 25/03305; H04L 25/03331; H04B 7/024; H04J 11/0053
See application file for complete search history.

(56) References Cited

U.S. PATENT DOCUMENTS 6,987,738 B2 * 1/2006 Subramanian et al. ....... 370/252
2005/0025254 A1 2/2005 Awad et al.
(Continued)

FOREIGN PATENT DOCUMENTS

CN 140 78 16 4/2003
CN 18 134 13 8/2006

*Primary Examiner* — Hassan Phillips
*Assistant Examiner* — Lonnie Sweet
(74) *Attorney, Agent, or Firm* — Fay Kaplun & Marcin, LLP

(57) ABSTRACT

A method for controlling the downlink transmission and a device for the signal associated processing in the coordinated multi-point transmission system are provided, which relate to the mobile communication technology, for optimizing the downlink transmission control in the coordinated multi-point transmission system. The embodiment aims at the coordinated multi-point transmission system, and in the base station side according to the SINR1 level of the frequency domain resource block fed back by the user, the mating result of the user, the associated resource allocation result and the pre-treatment weight value result, determines the Modulation and Coding Scheme (MCS) level of the scheduled user channel to provide the accuracy of the MCS level, thus optimizing the downlink resource configurations, further increasing the throughput of the system.

13 Claims, 4 Drawing Sheets

(51) Int. Cl.
*H04J 3/14* (2006.01)
*H04B 7/02* (2006.01)
*H04L 25/03* (2006.01)
*H04B 7/06* (2006.01)
*H04J 11/00* (2006.01)
*H04L 5/00* (2006.01)
*H04L 1/20* (2006.01)
*H04B 17/336* (2015.01)
*H04W 72/08* (2009.01)
*H04L 1/00* (2006.01)

(56) References Cited

U.S. PATENT DOCUMENTS

2006/0270360 A1* 11/2006 Han et al. .................. 455/69
2007/0153833 A1   7/2007 Chang et al.
2010/0177653 A1* 7/2010 Luo et al. ................. 370/252
2012/0218937 A1* 8/2012 Chen et al. ............... 370/328

* cited by examiner

METHOD AND DEVICE FOR CONTROLLING THE DOWNLINK TRANSMISSION IN THE COORDINATED MULTI-POINT TRANSMISSION SYSTEM

CROSS REFERENCE TO RELATED APPLICATIONS

The present application is a US National Stage of International Application No. PCT/CN2010/072238, filed 27 Apr. 2010, designating the United States, and claiming priority to Chinese Patent Application No. 200910083413.X filed 30 Apr. 2009.

FIELD

The present invention relates to the field of mobile communications and particularly to a coordinated multi-point transmission technology.

BACKGROUND

An Orthogonal Frequency Division Multiple Access (OFDMA) access is adopted in a Long Term Evolution (LTE)-Advanced (LTE-Advanced) system, and information of users in a cell is borne over different sub-carriers which are orthogonal to each other to thereby avoid multi-access interference between users. However it is not possible for the OFDMA access per se to inhibit inter-cell interference, and therefore interference influencing the performance of the LTE-Advanced system originates primarily from an adjacent cell, i.e., inter-cell interference. Further, networking at the same frequency or with a frequency multiplexing factor close to 1 is preferentially adopted in network deployment for the LTE-Advanced system in order to achieve higher spectrum utilization. In a traditional cellular system with networking at the same frequency, a user at the edge of a cell is subject to interference of a signal from an adjacent cell, and such interference may seriously limit the Quality of Service and the throughput of the user at the edge.

As illustrated in FIG. 1, a base station serving a user 1 is a base station 1, a base station serving a user 2 is a base station 2, and a base station serving a user 3 is a base station 3, for example. In the downlink, the user 1 receives interference signals of the base stations 2 and 3 in addition to a wanted signal of the base station 1; and alike, the user 2 receives interference signals of the base stations 1 and 3 in addition to a wanted signal of the base station 2, and the user 3 receives interference signals of the base stations 1 and 2 in addition to a wanted signal of the base station 3. In another word, the signals emitted from the base stations 1, 2 and 3 can be received by all the users 1, 2 and 3.

Therefore if a coordinated group is composed of the base stations 1, 2 and 3, then Coordinated Multi-Point (CoMP) transmission technology is used to transmit collectively the signals to the users 1, 2 and 3 and to pre-inhibit the interference signals at transmitters to thereby effectively reduce inter-cell interference and improve the signal to interference and noise ratios of signal reception of the respective users, thus improving the Quality of Service and the throughput of a user at the edge of a cell and improving the spectrum utilization of the system. CoMP transmission is implemented under the principle as illustrated in FIG. 2, where a coordinated group is composed of a plurality of base stations (or a plurality of radio frequency nodes spaced far away) and a set of coordinated cells is composed of serving cells of all the base stations in the group so that respective users in the coordinated cells are paired and have resources allocated thereto uniformly and according to the result of paring the users, the respective coordinated base stations jointly process and then collectively transmit downlink signals of the paired users. For example, coordinated groups are composed respectively of base stations 1, 2 and 3 or base stations 4, 5 and 6, and devices in the respective coordinated groups responsible for joint processing of signals can be arranged on one of the base stations or on a separate network entity connected with the respective base stations and a core network.

As illustrated in FIG. 3, in an LTE system, downlink transmission control of the uncoordinated system is performed separately at respective base stations, and for a plurality of users in serving cells, for which downlink data is to be transmitted concurrently, base stations schedule the users periodically according to feedback information of the users on the reception qualities of downlink channels, where a scheduling process includes the following operations:

S301. Serving base stations of users transmit downlink common pilots, and the users estimate channel H matrixes of respective receive downlink channels according to the common pilot signals of the downlink channels;

The common pilots are sequences known to the users, and the users can estimate the channel H matrixes of the downlink channels according to received signals and the known common pilot sequences.

S302. The users estimate the post-detection signal to interference and noise ratios $SINR_2$ of the corresponding downlink channels according to the estimated channel H matrixes of downlink data and a reception and detection scheme and search with the $SINR_2$ for Modulation and Coding Scheme (MCS) levels of the downlink channels;

Particularly there are 15 combinations of modulation and coding schemes in total, and with the identifiers of the 15 MCS levels, each MCS level corresponds to an SINR in a specific range. Therefore the corresponding MCS level can be found with the post-detection signal to interference and noise ratio $SINR_2$.

S303. The users feed the found MCS levels corresponding to the downlink channels back to the serving base stations;

S304. The serving base stations of the users determine a downlink radio resource allocation scheme according to the MCS levels corresponding to the downlink channels fed back from all the users of the base stations;

Specifically, a frequency resource for each downlink channel is a frequency resource block, and for feeding back the MCS level of the downlink channel, the user can feed back the serial number of each frequency resource block and the corresponding MCS level or a preset number of preferred frequency resource blocks with the highest MCS levels to the serving base station, and the base station can select several scheduled users with the highest MCS levels corresponding to the respective frequency resource blocks according to a preset criterion and the feedback information of the users and transmit preferentially the downlink data of the scheduled users.

S305. The base stations adjust the MCS levels fed back from the scheduled users and also notify the scheduled users about the adjusted MCS levels.

S306. The base stations modulate and encode the downlink channels of the users according to the adjusted MCS levels and transmit the downlink data; and S307. The scheduled users detect the downlink channels and receive the downlink data.

The inventors of the present application have identified that in downlink transmission of the coordinated multi-point transmission system, the signal of a user has to be weightpreprocessed at the transmitter but the weight of the preprocessing is unknown to the user side, therefore the post-detection signal to interference and noise ratio $SINR_2$ can not be estimated accurately merely from the downlink channel H matrix estimated from the common pilot and the reception and detection scheme, and consequently the MCS levels corresponding to the respective frequency resource blocks can not be determined accurately and the efficiency of downlink transmission control can not be guaranteed. Therefore the existing uncoordinated downlink transmission control solution can not be applied directly to the coordinated multi-point transmission system.

SUMMARY

Embodiments of the invention provide a method for downlink transmission control and a device responsible for joint processing of signals in a coordinated multi-point transmission system to optimize downlink transmission control in the coordinated multi-point transmission system.

A method for downlink transmission control in a coordinated multi-point transmission system includes:

pairing users in serving cells of respective coordinated base stations and allocating frequency resource blocks thereto and determining weights of downlink signal preprocessing of the respective paired users;

estimating respectively from the weight of preprocessing of each paired user a post-detection signal to interference and noise ratio $SINR_2$ when the user receives downlink data over the allocated frequency resource block;

determining, from the result of estimating the $SINR_2$ of each user, a Modulation and Coding Scheme, MCS, of the user and instructing the user to detect and receive the downlink data over the allocated frequency resource block with the MCS; and instructing the respective coordinated base stations to perform joint processing on the downlink data of the user according to the weight of preprocessing of the user, the frequency resource block allocated to the user and the MCS of the user.

Preferably pairing the users in the serving cells of the respective coordinated base stations and allocating the frequency resource blocks thereto includes:

acquiring levels of reception signal to interference and noise ratios $SINR_1$ corresponding to the frequency resource blocks and channel H matrixes of downlink channels corresponding to the frequency resource blocks, both of which are respectively measured by and reported from the users in the serving cells of the respective coordinated base stations; and pairing the users and allocating the frequency resource blocks thereto according to the acquired $SINR_1$ levels and channel H matrixes.

Preferably the levels of the reception signal to interference and noise ratios $SINR_1$ corresponding to the frequency resource blocks, which are reported from the users, include levels of reception signal to interference and noise ratios $SINR_1$ corresponding to several frequency resource blocks selected in a descending order of reception qualities.

Preferably, the users in the serving cells of the respective coordinated base stations measure and report the $SINR_1$ levels corresponding to the frequency resource blocks and reception strengths of wanted signals in downlink common pilot signals transmitted from the respective coordinated base stations respectively according to the downlink common pilot signals.

Estimating respectively from the weight of preprocessing of each paired user the post-detection signal to interference and noise ratio $SINR_2$ when the user receives the downlink data over the allocated frequency resource block includes:

estimating the post-detection signal to interference and noise ratio $SINR_2$ when each paired user receives the downlink data over the allocated frequency resource block respectively according to the $SINR_1$ level of the frequency resource block and the reception strength of the wanted signal in the downlink common pilot signal, both of which are fed back from the user, the result of the pairing the users, the weight of preprocessing, a downlink channel H matrix and a reception detection scheme.

Preferably estimating the post-detection signal to interference and noise ratio $SINR_2$ when each paired user receives the downlink data over the allocated frequency resource block respectively according to the $SINR_1$ level fed back from the user, the result of the pairing the users, the weight of preprocessing, the downlink channel H matrix and the reception detection scheme includes:

calculating a weight W of reception and detection according to the weight T of pre-processing, the downlink channel H matrix and the reception detection scheme;

calculating the sum of the strength $P_i$ of an interference signal and the strength $P_N$ of noise, $P_i+P_N$, according to the reception signal to interference and noise ratio $SINR_1$ and the reception strength of the wanted signal in the downlink common pilot signal; and estimating the post-detection $SINR_2$ as $$SINR_2 = \frac{|WHT|^2}{P_i + P_N}.$$

Preferably the channel H matrixes of the respective downlink channels are acquired from the coordinated base stations.

Preferably acquiring the channel H matrixes of the respective downlink channels from the coordinated base stations includes:

acquiring respectively the channel H matrixes of the downlink channels determined by the respective coordinated base stations, wherein the respective coordinated base stations acquire uplink channel H matrixes respectively from uplink pilot signals transmitted from user equipments and then determine the corresponding downlink channel H matrixes from the uplink channel H matrixes; or acquiring from the respective coordinated base stations the channel H matrixes fed back from the users.

A device responsible for joint processing of signals in a coordinated multi-point transmission system includes:

a unit configured to pair users in serving cells of respective coordinated base stations and allocate frequency resource blocks thereto and to determine weights of downlink signal preprocessing of the respective paired users;

a unit configured to estimate respectively from the weight of preprocessing of each paired user a post-detection signal to interference and noise ratio $SINR_2$ when the user receives downlink data over the allocated frequency resource block;

a unit configured to determine, from the result of estimating the $SINR_2$ of each user, a Modulation and Coding Scheme, MCS, of the user and to instruct the user to detect and receive the downlink data over the allocated frequency resource block with the MCS; and a unit configured to instruct the respective coordinated base stations to perform joint processing on the downlink data of the user according to the weight of preprocessing of the user, the frequency resource block allocated to the user and the MCS of the user.

Preferably the unit configured to pair the users in the serving cells of the respective coordinated base stations and allocate the frequency resource blocks thereto and to determine the weights of downlink signal preprocessing of the respective paired users includes:

a sub-unit configured to acquire levels of reception signal to interference and noise ratios $SINR_1$ corresponding to the frequency resource blocks and channel H matrixes of downlink channels corresponding to the frequency resource blocks, both of which are respectively measured by and reported from the users in the serving cells of the respective coordinated base stations; and a sub-unit configured to pair the users and allocate the frequency resource blocks thereto according to the acquired $SINR_1$ levels and channel H matrixes and to determine the weights of downlink signal preprocessing of the respective paired users.

Preferably the unit configured to estimate the post-detection signal to interference and noise ratio $SINR_2$ when each user receives the downlink data over the allocated frequency resource block includes:

a sub-unit configured to calculate a weight W of reception and detection according to the weight T of pre-processing, a downlink channel H matrix and a reception detection scheme;

a sub-unit configured to calculate the sum of the strength $P_i$ of an interference signal and the strength $P_N$ of noise according to the reception signal to interference and noise ratio $SINR_1$ and the reception strength of a wanted signal in a downlink common pilot signal; and a sub-unit configured to estimate the post-detection $SINR_2$ as $$SINR_2 = \frac{|WHT|^2}{P_i + P_N}.$$

According to the embodiments of the invention, the MCS level of the channels of the scheduled users can be determined at the base station side according to the $SINR_1$ levels of the frequency resource blocks fed back from the users, the result of pairing the users, the result of joint allocation of resources and the result of weight-preprocessing, for the coordinated multi-point transmission system so as to provide the MCS levels with accuracy to thereby optimize configuring of downlink resources and further improve the throughput of the system.

DETAILED DESCRIPTION

According to embodiments of the invention, such a downlink transmission control technology is provided for a coordinated multi-point transmission system that users are paired, resources are allocated jointly and weights of preprocessing are determined and then MCS levels of channels of scheduled users are determined at the base station side to provide the MCS levels with accuracy, thus optimizing configuring of downlink resources and further improving the throughput of the system.

Figure 1:
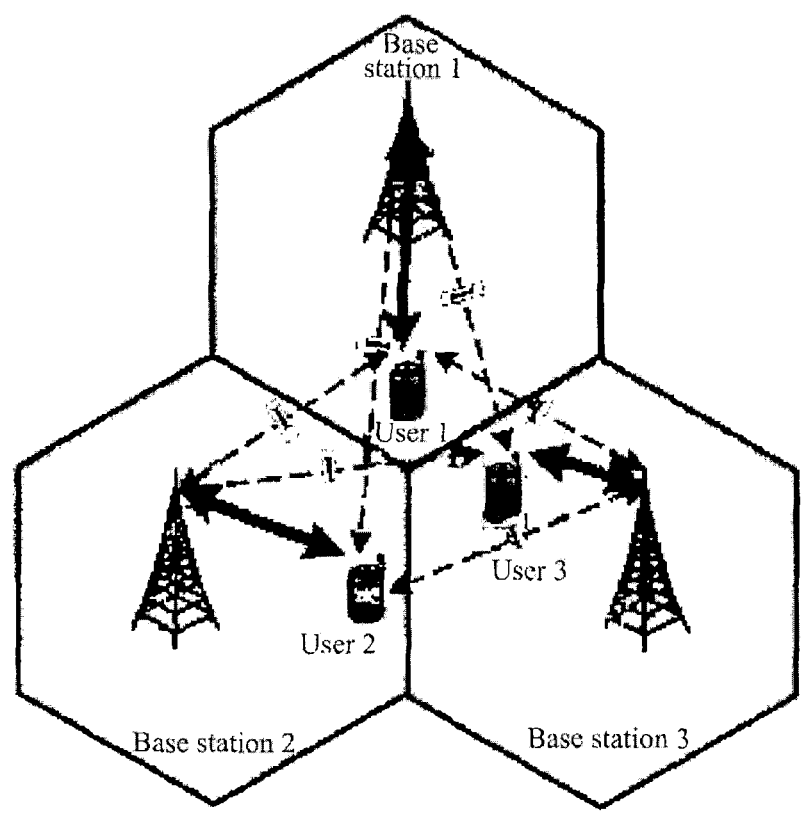
FIG. 1 is a schematic diagram of the principle of the uncoordinated system described in Background of the Invention.
Figure 2:
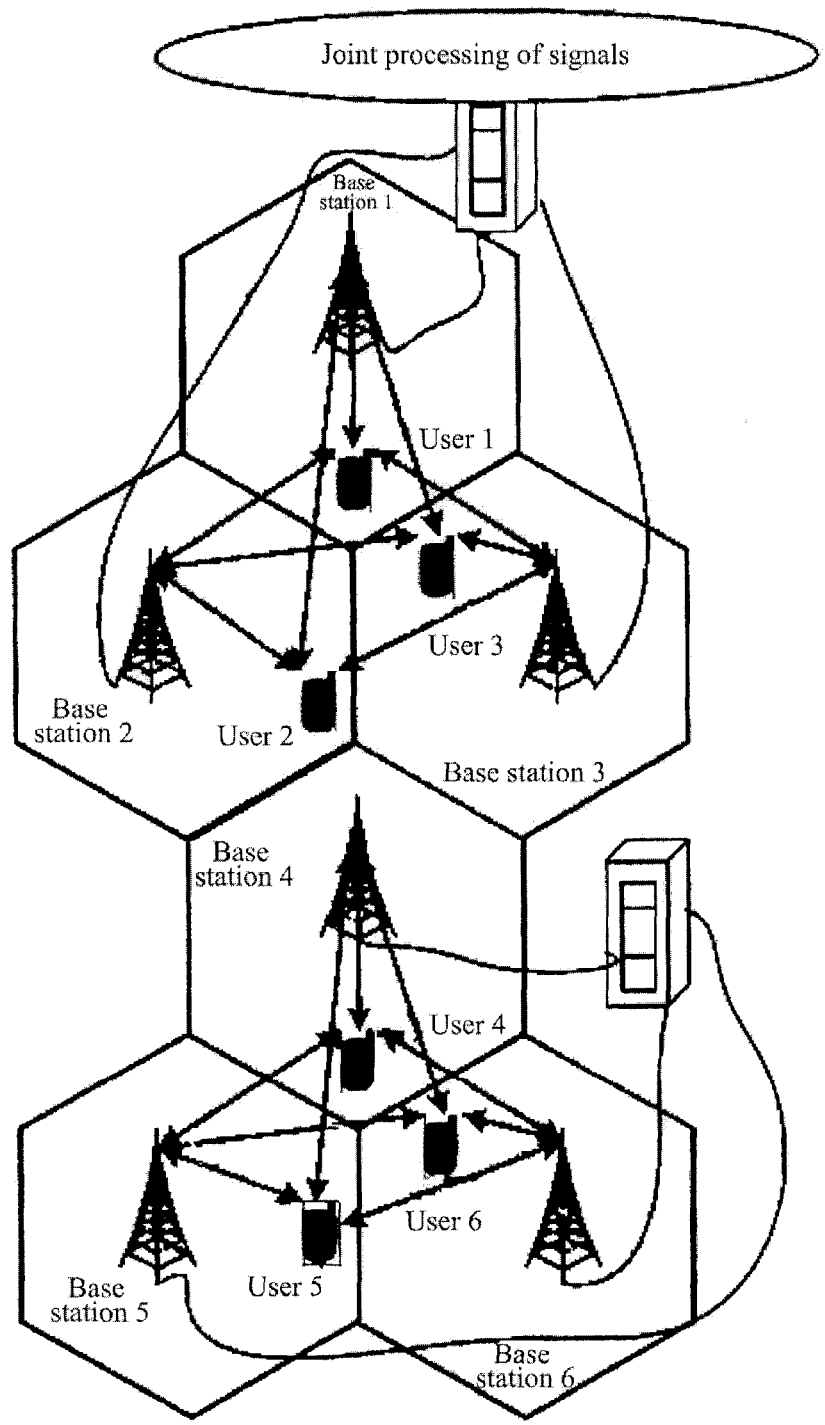
FIG. 2 is a schematic diagram of the principle of the coordinated multi-point transmission system described in Background of the Invention.
Figure 3:
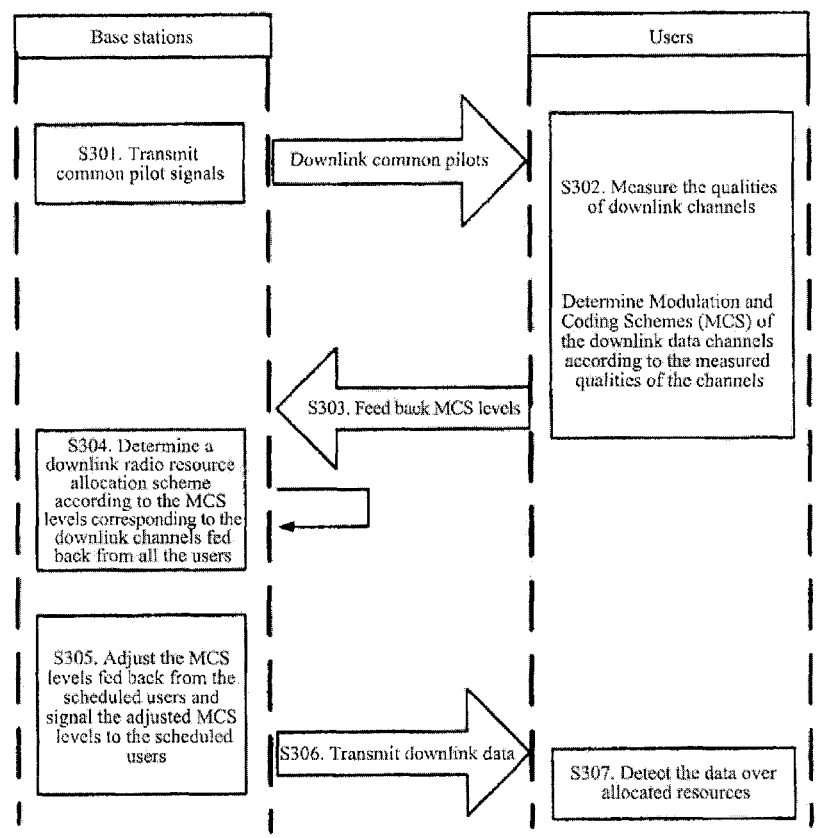
FIG. 3 is a schematic diagram of the flow for downlink transmission control in the uncoordinated system described in Background of the Invention.

As illustrated in FIG. 2, in the coordinated system, the device responsible for joint processing of signals may be arranged on one of the base stations or on a separate network entity. The device responsible for joint processing of signals is responsible for downlink transmission control of coordinated multi-point transmission.

Figure 4:
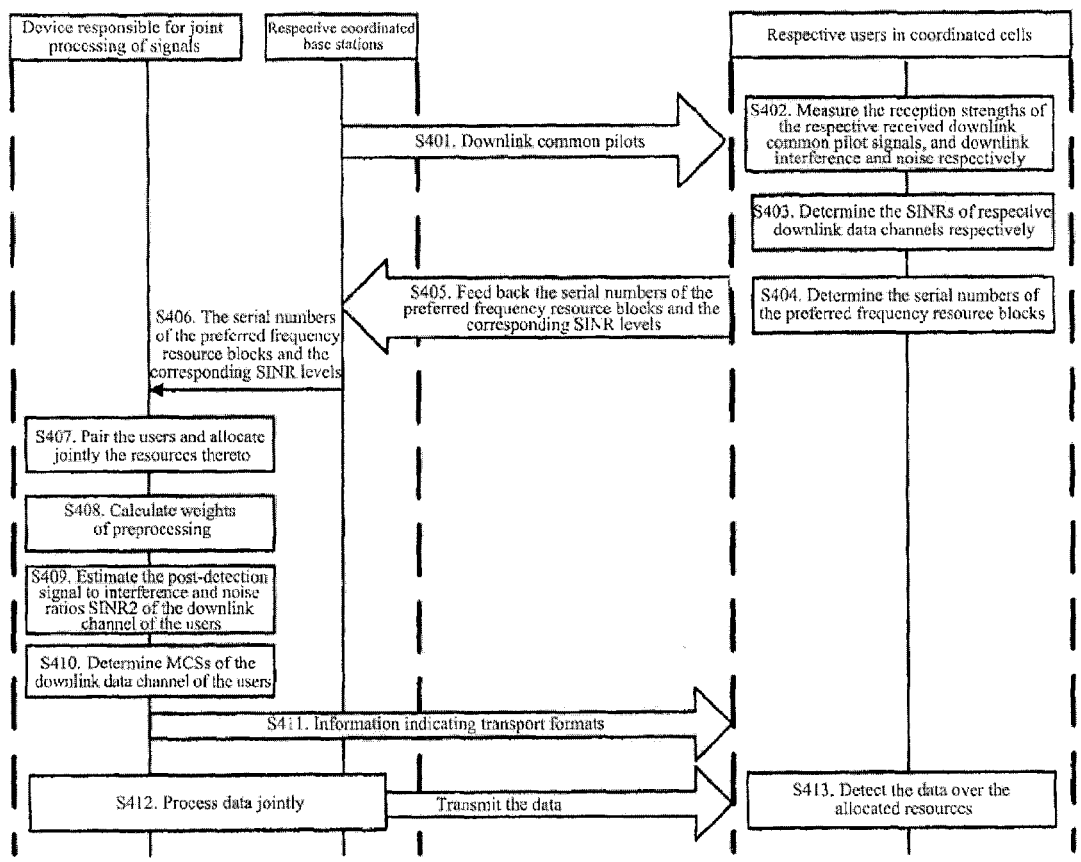
FIG. 4 is a schematic diagram of a flow for downlink transmission control in a coordinated multi-point transmission system according to an embodiment of the invention.

As illustrated in FIG. 4, an embodiment of the invention will be described taking a coordinated group composed of a number M of base stations as an example, where common pilot sequences of the respective coordinated base station in the coordinated group are $D_1, D_2 \ldots D_i \ldots D_M$ respectively, and a method for downlink transmission control in a coordinated multi-point transmission system generally includes the following operations:

S401. The respective coordinated base stations in the group of coordinated base stations transmit their own respective downlink common pilot signals respectively over all the frequency resource blocks;

S402. Users receive the downlink common pilot signals, transmitted from the respective coordinated base stations in the group of coordinate, respectively over downlink channels corresponding to the respective frequency resource blocks, measure the reception strengths of the downlink common pilot signals received over the respective downlink channels and the reception strengths of wanted signals in the downlink common pilot signals respectively and determine downlink interference and noise strengths corresponding to the downlink channels;

In fact, a downlink common pilot signal received by a user over a downlink channel is a signal resulting from overlapping of downlink common pilot signals, transmitted from all or a part of the coordinated base stations, which can be received over the downlink channel.

S403. The users determine the real reception signal to interference and noise ratios $SINR_1$ of the respective downlink channels;

Particularly, the real reception signal to interference and noise ratio $SINR_1$ of a downlink channel may be determined as follows:

each downlink channel is estimated from the reception strength Y of the downlink common pilot signal received over the downlink channel and common pilot sequences $D_1, D_2 \ldots D_M$ of a number M of coordinated base stations to determine a channel H matrix, $H_1, H_2 \ldots H_M$, of the downlink channel;

the interference and noise I of the downlink channel is determined as $I = Y - H_1D_1 - H_2D_2 - \ldots - H_MD_M$; and the reception signal to interference and noise ratio $SINR_1$ of the downlink common pilot signal is determined as $SINR_1 = (H_1D_1 + H_2D_2 + \ldots + H_MD_M)/I$.

S404. The users determine the serial numbers of the preferred frequency resource blocks for several preceding downlink channels with a better reception quality in a descending order according to the magnitudes of the reception signal to interference and noise ratios $SINR_1$;

S405. The users report to the coordinated base stations the serial numbers of the selected preferred frequency resource blocks as well as the levels of the reception signal to interference and noise ratios $SINR_1$, and the reception strengths of the wanted signals, corresponding to the respective preferred frequency resource blocks;

It shall be noted here the users may alternatively report to the coordinated base stations the serial numbers of and the reception strengths of the wanted signals of all the frequency resource blocks.

S406. The respective coordinated base stations transmit to a device responsible for joint processing of signals the levels of the reception signal to interference and noise ratios $SINR_1$, and the reception strengths of the wanted signals, corresponding to the preferred frequency resource blocks, which are reported from the users in serving cells respectively;

S407. The device responsible for joint processing of signals pairs the users and allocates the frequency resource blocks according to the serial numbers of the preferred frequency resource blocks and their corresponding levels of the reception signal to interference and noise ratios $SINR_1$ and reception strengths of the wanted signals, which are fed back from the users in all the coordinated cells, and the channel H matrixes of the downlink channels corresponding to the respective frequency resource blocks;

The channel H matrixes is used for calculation of the correlation between the channels when the users are paired, where the device responsible for joint processing of signals may derive the channel H matrixes in two methods, in one of which the respective coordinated base stations derive uplink channel H matrixes respectively from uplink pilot signals transmitted from user equipments and then determine downlink channel H matrixes based upon such a property that the uplink channel H matrixes and the downlink channel H matrixes are equal and transmit them to the device responsible for joint processing of signals; and in the other of which the user equipments feed back the estimated downlink channel H matrixes to the bases station, which in turn report them collectively to the device responsible for joint processing of signals.

The users are paired and the resources are allocated jointly under such a principle that typically a user with the highest level of the fed-back reception signal to interference and noise ratio $SINR_1$ is first allocated with a frequency resource block and then a paired user using the frequency resource block is determined in a preset method. For example, assumed there are a number N of users to be paired and a number K of frequency resource blocks that can be allocated, then for the $k^{th}$ ($1 \le k \le K$) frequency resource block, firstly a user 1 over the frequency resource block with the best corresponding channel condition is selected, then a user 2 over the $k^{th}$ frequency resource block with the best orthogonality to the user 1 is selected, and next a user 3 over the $k^{th}$ frequency resource block with the best orthogonality to both the user 1 and the user 2 is selected and user M ($M \le N$) over the $k^{th}$ frequency resource block with the best orthogonality to both the user 1, the user 2, . . . , the user (M−1) are selected sequentially.

The users 1 to M are paired for the frequency resource block k and the frequency resource block is allocated thereto, and then the users are paired for a number K of frequency resource blocks and radio resources of the base stations are allocated thereto sequentially as in the foregoing method.

The foregoing algorithm is merely an example, and those skilled in the art can alternatively determine paring of the users and a radio resource allocation scheme in other algorithms, which will not be described here in details.

S408. The device responsible for joint processing of signals calculates weights of downlink preprocessing respectively for the respective paired users over the respective frequency resource blocks;

A downlink data signal of each paired user shall be pre-processed with a weight, and the weight of preprocessing may be calculated from the channel H matrix of the user in a specific algorithm well known to those skilled in the art, e.g., Zero Forcing (ZF) algorithm, Block Diagonalization (BD) algorithm, Dirty Paper Coding (DPC) algorithm, etc., which will not be described here in details.

S409. The device responsible for joint processing of signals further estimates the post-detection signal to interference and noise ratios $SINR_2$ of the downlink channels of the users according to the $SINR_1$ levels fed back from the users, the result of paring the users, the weights of pre-processing, the downlink channel H matrixes and the reception and detection scheme;

The post-detection signal to interference and noise ratio $SINR_2$ may be estimated, for example, in the following method:

1) a weight W of reception and detection is calculated from a weight T of pre-processing, the downlink channel H matrix and the reception detection scheme;

2) the sum of the strength $P_i$ of an interference signal I and the strength $P_N$ of noise N, $P_i+P_N$, is calculated from the reception signal to interference and noise ratio $SINR_1$ and the reception strength $P_D$ of a wanted signal D in a downlink common pilot signal in a specific calculation method well known to those skilled in the art, which will not be described here in details; and 3) the post-detection $SINR_2$ is estimated as $$SINR_2 = \frac{|WHT|^2}{P_i + P_N},$$

where |WHT| represents the modulus of the product of W, H and T.

S410. Modulation and Coding Schemes (MCS) of the downlink channels of the users are determined from the estimated post-detection signal to interference and noise ratios $SINR_2$;

S411. The device, responsible for joint processing of signals, notifies the users about information indicating transport formats of the downlink channels of the users (including information indicating the allocated frequency resource blocks, information indicating the MCSs, etc.) through the respective coordinated base stations;

S412. The device, responsible for joint processing of signals, notifies all the coordinated base stations, which weight-process and then transmit downlink data of paired users, about the information indicating the allocated frequency resource blocks, the information indicating the MCSs, and the weights of downlink preprocessing, of the respective paired users.

In the coordinated multi-point transmission system, the downlink data of the paired users are scheduled jointly so that at least two coordinated base stations used for each user transmit the downlink data jointly over the frequency resource blocks allocated to the user. The result of paring the users shall be reported to an upper network device of a core network, which in turn notifies the respective coordinated base stations performing a coordinated process for the users about transmission of the downlink data of the users according to the result of paring the users, and the respective coordinated base stations encodes, modulates and weight-preprocess the downlink data of the paired user and then transmit it over the corresponding downlink channels according to the result of joint allocation of the resources.

S413. The users detect the downlink data, with corresponding dedicated pilots or with the weights of preprocessing notified from the coordinated base stations, over the resources of the allocated frequency resource blocks according to the information indicating the transport formats.

The system configures each frequency resource block with a corresponding dedicated pilot sequence configured for a user with respect to the frequency resource block, and the user can use the dedicated pilot sequence for detection of the downlink data over the allocated frequency resource block.

The device responsible for joint processing of signals may alternatively notify the paired users about the weights of downlink pre-processing through the coordinated home base stations of the paired users, and the paired users can detect the downlink data over the resource of the allocated frequency resource blocks according to the weights of downlink pre-processing and the channel H matrixes.

To make the embodiment of the invention more apparent, the method for downlink transmission control according to the embodiment of the invention will be further described by way of a specific example with reference to FIG. 2. For example, the device responsible for joint processing of signals determines the user 1 and the user 2 as paired users according to measurement results reported from all the users in the coordinated cells and allocates the same frequency resource blocks to the user 1 and the user 2, and if the frequency resource blocks allocated to the user 1 and the user 2 are radio resources of the base station 1, the base station 2 and the base station 3, then the base station 1, the base station 2 and the base station 3 process jointly the downlink data of the user 1 and the user 2. For the user 1, the device, responsible for joint processing of signals, notifies the base station 1, the base station 2 and the base station 3 about the pre-weighting value of the user 1, and then the base station 1, the base station 2 and the base station 3 encode and weigh-preprocess the data of the user 1 respectively with the pre-weighting value and transmit it over the corresponding downlink channel, and the user 1 detects the downlink data transmitted jointly from the base station 1, the base station 2 and the base station 3 with the dedicated pilot sequence or with the pre-weighting value notified from the base stations. The same also applies to joint processing of the downlink data for the user 2, a repeated description of which will not be repeated here. After joint processing is performed, a signal received by any user from a non-home cell is not an interference signal any longer, thereby improving the home quality and the throughput of a user at the edge of a cell and also the spectrum utilization of the system.

In summary, the MCS levels of the channels of the scheduled users can be determined at the base station side according to the $SINR_1$ levels of the frequency resource blocks fed back from the users, the result of pairing the users, the result of joint allocation of resources and the weights of preprocessing, for the coordinated multi-point transmission system according to the embodiment of the invention so as to provide the MCS levels with accuracy to thereby optimize configuring of downlink resources and further improve the throughput of the system.

Evidently those skilled in the art can make various modifications and variations to the embodiments of invention without departing from the scope of the invention. Thus the invention is also intended to encompass these modifications and variations thereto provided that the modifications and variations come into the scope of the claims appended to the invention and their equivalents.

The invention claimed is:

1. A method for downlink transmission control in a coordinated multi-point transmission system, comprising:
using a device responsible for joint processing of signals, pairing users in serving cells of respective coordinated base stations and allocating frequency resource blocks thereto and determining weights of downlink signal preprocessing of the respective paired users;
using the device responsible for joint processing of signals, estimating respectively from the weight of preprocessing of each paired user a post-detection signal to interference and noise ratio $SINR_2$ when the user receives downlink data over the allocated frequency resource block;
using the device responsible for joint processing of signals, determining, from the result of estimating the $SINR_2$ of each user, a Modulation and Coding Scheme, MCS, of the user and instructing the user to detect and receive the downlink data over the allocated frequency resource block with the MCS; and
using the device responsible for joint processing of signals, instructing the respective coordinated base stations to perform joint processing on the downlink data of the user according to the weight of preprocessing of the user, the frequency resource block allocated to the user and the MCS of the user;
wherein pairing the users in the serving cells of the respective coordinated base stations and allocating the frequency resource blocks thereto comprises:
acquiring levels of reception signal to interference and noise ratios $SINR_1$ corresponding to the frequency resource blocks and channel H matrixes of downlink channels corresponding to the frequency resource blocks, both of which are respectively measured by and reported from the users in the serving cells of the respective coordinated base stations; and
pairing the users and allocating the frequency resource blocks thereto according to the acquired $SINR_1$ levels and channel H matrixes.

2. The method of claim 1, wherein the levels of the reception signal to interference and noise ratios $SINR_1$ corresponding to the frequency resource blocks, which are reported from the users, comprise:
levels of reception signal to interference and noise ratios $SINR_1$ corresponding to several frequency resource blocks selected in a descending order of reception qualities.

3. The method of claim 1, further comprising:
measuring and reporting, by the users in the serving cells of the respective coordinated base stations, the $SINR_1$ levels corresponding to the frequency resource blocks and reception strengths of wanted signals in downlink common pilot signals transmitted from the respective coordinated base stations respectively according to the downlink common pilot signals; and
estimating respectively from the weight of preprocessing of each paired user the post-detection signal to interference and noise ratio $SINR_2$ when the user receives the downlink data over the allocated frequency resource block comprises:
estimating the post-detection signal to interference and noise ratio $SINR_2$ when each paired user receives the downlink data over the allocated frequency resource block respectively according to the $SINR_1$ level of the frequency resource block and the reception strength of the wanted signal in the downlink common pilot signal, both of which are fed back from the user, the result of the pairing the users, the weight of preprocessing, a downlink channel H matrix and a reception detection scheme.

4. The method of claim 3, wherein estimating the post-detection signal to interference and noise ratio $SINR_2$ when each paired user receives the downlink data over the allocated frequency resource block respectively according to the $SINR_1$ level fed back from the user, the result of the pairing the users, the weight of preprocessing, the downlink channel H matrix and the reception detection scheme comprises:

calculating a weight W of reception and detection according to the weight T of pre-processing, the downlink channel H matrix and the reception detection scheme;

calculating the sum of the strength $P_i$ of an interference signal and the strength $P_N$ of noise, $P_i+P_N$, according to the reception signal to interference and noise ratio $SINR_1$ and the reception strength of the wanted signal in the downlink common pilot signal; and estimating the post-detection $SINR_2$ as $$SINR_2 = \frac{|WHT|^2}{P_i + P_N}.$$

5. The method of claim 1, wherein the channel H matrixes of the respective downlink channels are acquired from the coordinated base stations.

6. The method of claim 5, wherein acquiring the channel H matrixes of the respective downlink channels from the coordinated base stations comprises:

acquiring respectively the channel H matrixes of the downlink channels determined by the respective coordinated base stations, wherein the respective coordinated base stations acquire uplink channel H matrixes respectively from uplink pilot signals transmitted from a user equipment and then determine the corresponding downlink channel H matrixes from the uplink channel H matrixes; or acquiring from the respective coordinated base stations the channel H matrixes fed back from the users.

7. The method of claim 1, further comprising:

measuring and reporting, by the users in the serving cells of the respective coordinated base stations, the $SINR_1$ levels corresponding to the frequency resource blocks and reception strengths of wanted signals in downlink common pilot signals transmitted from the respective coordinated base stations respectively according to the downlink common pilot signals; and estimating respectively from the weight of preprocessing of each paired user the post-detection signal to interference and noise ratio $SINR_2$ when the user receives the downlink data over the allocated frequency resource block comprises:

estimating the post-detection signal to interference and noise ratio $SINR_2$ when each paired user receives the downlink data over the allocated frequency resource block respectively according to the $SINR_1$ level of the frequency resource block and the reception strength of the wanted signal in the downlink common pilot signal, both of which are fed back from the user, the result of the pairing the users, the weight of preprocessing, a downlink channel H matrix and a reception detection scheme.

8. The method of claim 7, wherein estimating the post-detection signal to interference and noise ratio $SINR_2$ when each paired user receives the downlink data over the allocated frequency resource block respectively according to the $SINR_1$ level fed back from the user, the result of the pairing the users, the weight of preprocessing, the downlink channel H matrix and the reception detection scheme comprises:

calculating a weight W of reception and detection according to the weight T of pre-processing, the downlink channel H matrix and the reception detection scheme;

calculating the sum of the strength $P_i$ of an interference signal and the strength $P_N$ of noise, $P_i+P_N$, according to the reception signal to interference and noise ratio $SINR_1$ and the reception strength of the wanted signal in the downlink common pilot signal; and estimating the post-detection $SINR_2$ as $$SINR_2 = \frac{|WHT|^2}{P_i + P_N}.$$

9. The method of claim 2, further comprising:

measuring and reporting, by the users in the serving cells of the respective coordinated base stations, the $SINR_1$ levels corresponding to the frequency resource blocks and reception strengths of wanted signals in downlink common pilot signals transmitted from the respective coordinated base stations respectively according to the downlink common pilot signals; and estimating respectively from the weight of preprocessing of each paired user the post-detection signal to interference and noise ratio $S1NR_2$ when the user receives the downlink data over the allocated frequency resource block comprises:

estimating the post-detection signal to interference and noise ratio $SINR_2$ when each paired user receives the downlink data over the allocated frequency resource block respectively according to the $SINR_1$ level of the frequency resource block and the reception strength of the wanted signal in the downlink common pilot signal, both of which are fed back from the user, the result of the pairing the users, the weight of preprocessing, a downlink channel H matrix and a reception detection scheme.

10. The method of claim 9, wherein estimating the post-detection signal to interference and noise ratio $SINR_2$ when each paired user receives the downlink data over the allocated frequency resource block respectively according to the $SINR_1$ level fed back from the user, the result of the pairing the users, the weight of preprocessing, the downlink channel H matrix and the reception detection scheme comprises:

calculating a weight W of reception and detection according to the weight T of pre-processing, the downlink channel H matrix and the reception detection scheme;

calculating the sum of the strength $P_i$ of an interference signal and the strength $P_N$ of noise, $P_i+P_N$, according to the reception signal to interference and noise ratio $SINR_1$ and the reception strength of the wanted signal in the downlink common pilot signal; and estimating the post-detection $SINR_2$ as $$SINR_2 = \frac{|WHT|^2}{P_i + P_N}.$$

11. A device responsible for joint processing of signals in a coordinated multi-point transmission system, comprising:

a memory; and at least one processor, wherein:

the memory is configured to store computer readable program codes, and the processor executes the computer readable program codes to implement:

a unit configured to pair users in serving cells of respective coordinated base stations and allocate frequency resource blocks thereto and to determine weights of downlink signal preprocessing of the respective paired users;

a unit configured to estimate respectively from the weight of preprocessing of each paired user a post-detection signal to interference and noise ratio $SINR_2$ when the user receives downlink data over the allocated frequency resource block;

a unit configured to determine, from the result of estimating the $SINR_2$ of each user, a Modulation and Coding Scheme, MCS, and to instruct the user to detect and receive the downlink data over the allocated frequency resource block with the MCS; and a unit configured to instruct the respective coordinated base stations to perform joint processing on the downlink data of the user according to the weight of preprocessing of the user, the frequency resource block allocated to the user and the MCS of the user;

wherein the unit configured to pair the users in the serving cells of the respective coordinated base stations and allocate the frequency resource blocks thereto and to determine the weights of downlink signal preprocessing of the respective paired users comprises:

a sub-unit configured to acquire levels of reception signal to interference and noise ratios $SINR_1$ corresponding to the frequency resource blocks and channel H matrixes of downlink channels corresponding to the frequency resource blocks, both of which are respectively measured by and reported from the users in the serving cells of the respective coordinated base stations; and a sub-unit configured to pair the users and allocate the frequency resource blocks thereto according to the acquired $SINR_1$ levels and channel H matrixes and to determine the weights of downlink signal preprocessing of the respective paired users.

12. The device of claim 11, wherein the unit configured to estimate the post-detection signal to interference and noise ratio $SINR_2$ when each user receives the downlink data over the allocated frequency resource block comprises:

a sub-unit configured to calculate a weight W of reception and detection according to the weight T of pre-processing, a downlink channel H matrix and a reception detection scheme;

a sub-unit configured to calculate the sum of the strength $P_i$ of an interference signal and the strength $P_N$ of noise according to the reception signal to interference and noise ratio $SINR_1$ and the reception strength of a wanted signal in a downlink common pilot signal; and a sub-unit configured to estimate the post-detection $SINR_2$ as $$SINR_2 = \frac{|WHT|^2}{P_i + P_N}.$$

13. The device of claim 11, wherein the unit configured to estimate the post-detection signal to interference and noise ratio $SINR_2$ when each user receives the downlink data over the allocated frequency resource block comprises:

a sub-unit configured to calculate a weight W of reception and detection according to the weight T of pre-processing, a downlink channel H matrix and a reception detection scheme;

a sub-unit configured to calculate the sum of the strength $P_i$, of an interference signal and the strength $P_N$ of noise according to the reception signal to interference and noise ratio $SINR_1$ and the reception strength of a wanted signal in a downlink common pilot signal; and a sub-unit configured to estimate the post-detection $SINR_2$ as $$SINR_2 = \frac{|WHT|^2}{P_i + P_N}.$$

* * * * *